T862019

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MAY 27, 1969

862 O.G. 1010

789,377

PHOTOGRAPHIC DEVELOPER AND PROCESS

William E. Lee, % Kodak Park Division,
Rochester, N.Y. 14650

Filed Jan. 6, 1969. Published May 27, 1969
Int. Cl. G03c *5/30*
U.S. Cl. 96—66
No Drawing. 14 Pages Specification

A photographic developer for high contrast elements comprises an alkaline development activator, a silver halide developing agent, sulfite ions and a sulfite ion buffer, which is a complex of sulfite ions with a trinitroaryl compound, such as 2,4,6-trinitrobenzoic acid, the complex having an absorption peak between about 450 and 600 millimicrons. A suitable developer is a lith developer, for example, which is an aqueous alkaline solution containing a silver halide developing agent, such as hydroquinone; sulfite ions, such as from sodium sulfite and sodium bisulfite; and 2,4,6-trinitrobenzoic acid, the trinitrobenzoic acid and sulfite compounds forming a complex in situ which is a sulfite ion buffer in the developer. This can be used in a process, such as a continuous process, for developing images in an exposed photographic element, such as a photographic element employed in the graphic arts.